(12) United States Patent
Liou et al.

(10) Patent No.: US 7,489,500 B2
(45) Date of Patent: Feb. 10, 2009

(54) FLAT PANEL DISPLAY WITH MULTIFUNCTIONAL STAND

(75) Inventors: Guan-De Liou, Taipei (TW); Chia-Pine Huang, Keelung (TW); Li-Li Lai, Taipei (TW); Stephen Tsai, Sijhih (TW)

(73) Assignee: Hannspree, Inc., Taipei (TW)

( * ) Notice: Subject to any disclaimer, the term of this patent is extended or adjusted under 35 U.S.C. 154(b) by 0 days.

(21) Appl. No.: 11/563,999

(22) Filed: Nov. 28, 2006

(65) Prior Publication Data

US 2008/0099656 A1 May 1, 2008

(30) Foreign Application Priority Data

Oct. 27, 2006 (TW) .............................. 95139715 A (51) Int. Cl.
*H05K 7/12* (2006.01)
(52) U.S. Cl. .................. 361/681; 361/682; 248/688
(58) Field of Classification Search .................. 361/681, 361/682; 248/688
See application file for complete search history.

(56) References Cited

U.S. PATENT DOCUMENTS 5,799,917 A * 9/1998 Li ........................... 248/284.1
6,366,452 B1 * 4/2002 Wang et al. ................. 361/681
6,478,275 B1 * 11/2002 Huang ....................... 248/284.1
6,857,610 B1 * 2/2005 Conner et al. ............. 248/284.1

* cited by examiner

*Primary Examiner*—Lisa Lea-Edmonds
*Assistant Examiner*—Ingrid Wright
(74) *Attorney, Agent, or Firm*—Apex Juris, pllc; Tracy M. Heims (57) ABSTRACT

A flat panel display with a multifunctional stand is provided. The flat panel display includes a display body and a stand body comprises a first and a second fixed stays parallel to each other, a connecting member, a pivot member, and a support. The connecting member connects the first and second fixed stays. A slit is formed between the connecting member and the first and second fixed stays. The pivot member jointed with the rear of the display body to adjust the viewing angle. The support has one end connected to the second fixed stay and the other end connected to the pivot member. Accordingly, the display body may be placed on various locations such as placed on a desk top directly, clamping by the first and second fixed stays to fasten on a desk edge, or hung on a partition board.

25 Claims, 15 Drawing Sheets

FLAT PANEL DISPLAY WITH MULTIFUNCTIONAL STAND

CROSS-REFERENCES TO RELATED APPLICATIONS

This non-provisional application claims priority under 35 U.S.C. § 119(a) on Patent Application No(s). 95139715 filed in Taiwan, R.O.C. on Oct. 27, 2006, the entire contents of which are hereby incorporated by reference.

BACKGROUND OF THE INVENTION

1. Field of Invention

The present invention relates to a flat panel display, and more particularly to a flat panel display with a multifunctional stand.

2. Related Art

Generally, a conventional liquid crystal display is equipped with a stand for placing on a desk. A pivot member is also be configured, allowing the user to adjust the viewing angle of the liquid crystal display. However, if the user needs to hang the liquid crystal display on a wall due to decoration considerations or limited space, an additional support frame (wall-mount support frame) is required to be fastened on the wall for hanging the liquid crystal display. If the liquid crystal display needs to be removed from the wall, the support frame must be dismount from the wall then remove the liquid crystal display. It takes time and efforts, and does not meet the cost consideration. For those who refuse to bother, the liquid crystal display is usually placed on the desk and cannot be located freely to any desired location according to the users' viewing demands.

Since the panel size of the liquid crystal display in the market is getting larger, the occupied space on the desk will be larger as well, and not allowing the user to place other articles for efficiently arranging the available space on the desk. Therefore, improving the structure of the display stand to allow the user easily relocating the liquid crystal display on the desk or the wall to increase the flexibility of space arrangement, has become an urgent and significant issue.

SUMMARY OF THE INVENTION

In accordance with the problems noted above, the present invention provides a flat panel display with a multifunctional stand.

According to the exemplary embodiment disclosed in the invention, the flat panel display includes a display body, a stand body comprising a first fixed portion, a second fixed portion, an extending portion, a support and a pivot member; wherein the second fixed portion faces the first fixed portion, and uses the extending portion to connect one end of the first fixed portion and the second fixed portion respectively; the first fixed portion, the second fixed portion and the extending portion form a U-shaped portion in between; one end of the support is connected with the second fixed portion, while the other end connects with the pivot member; the pivot member joints with the rear of the display body, thereby the pivot member may be used to adjust the viewing angle of the display body.

When the display body is designated to configure on a desk, the first fixed portion and the second fixed portion may clamp the desk top to fasten on a desk edge, or place the display body on the desk directly; then the display body may be adjusted to an appropriate viewing angle. The first fixed portion and the second fixed portion may also be used to clamp on a partition board to allow the display body hanging on a partition board; or the first fixed portion may be fastened directly on the wall. Eventually, the user is allowed relocating the display body on various locations.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Figure 1A:
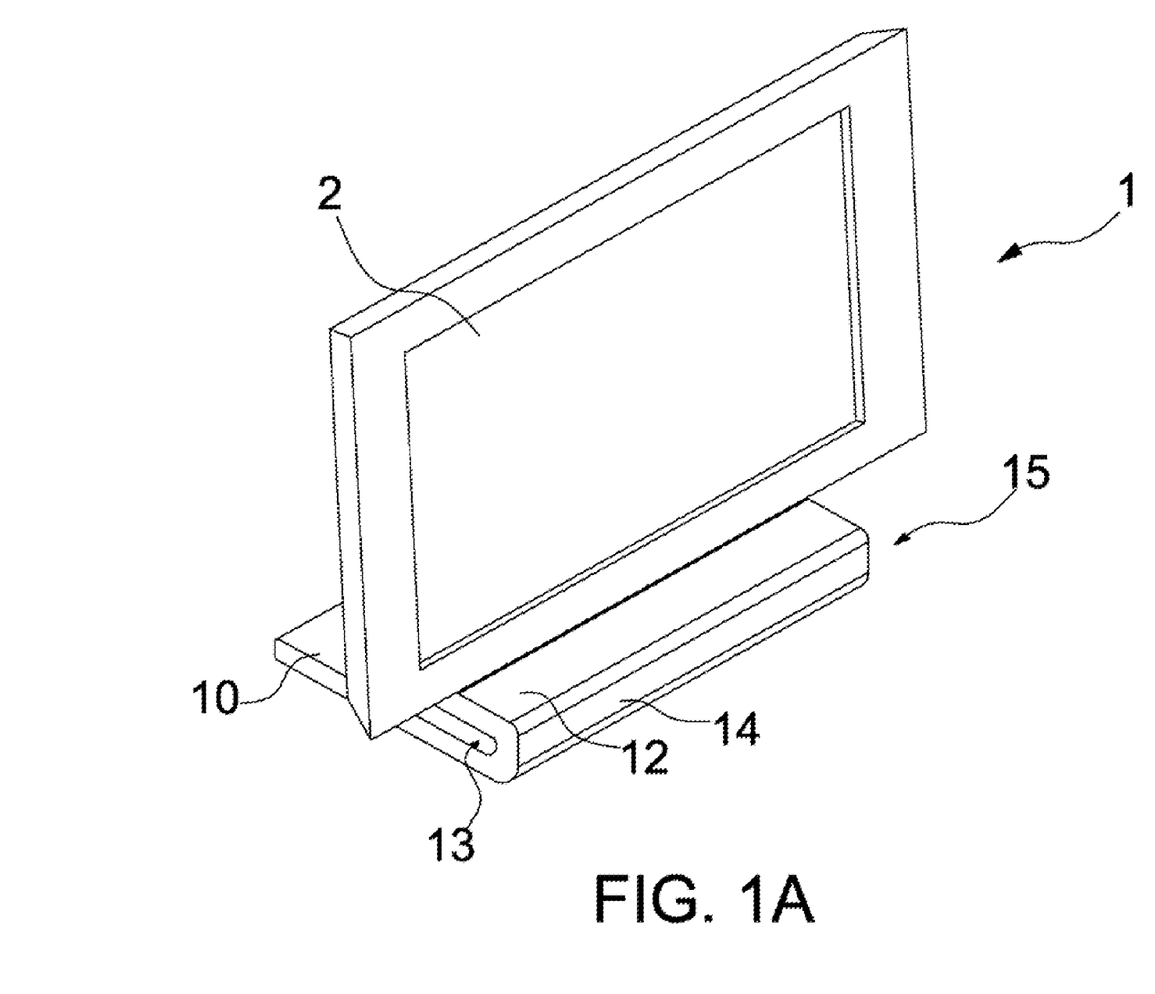
FIG. 1A is a perspective view of the present invention.
Figure 1B:
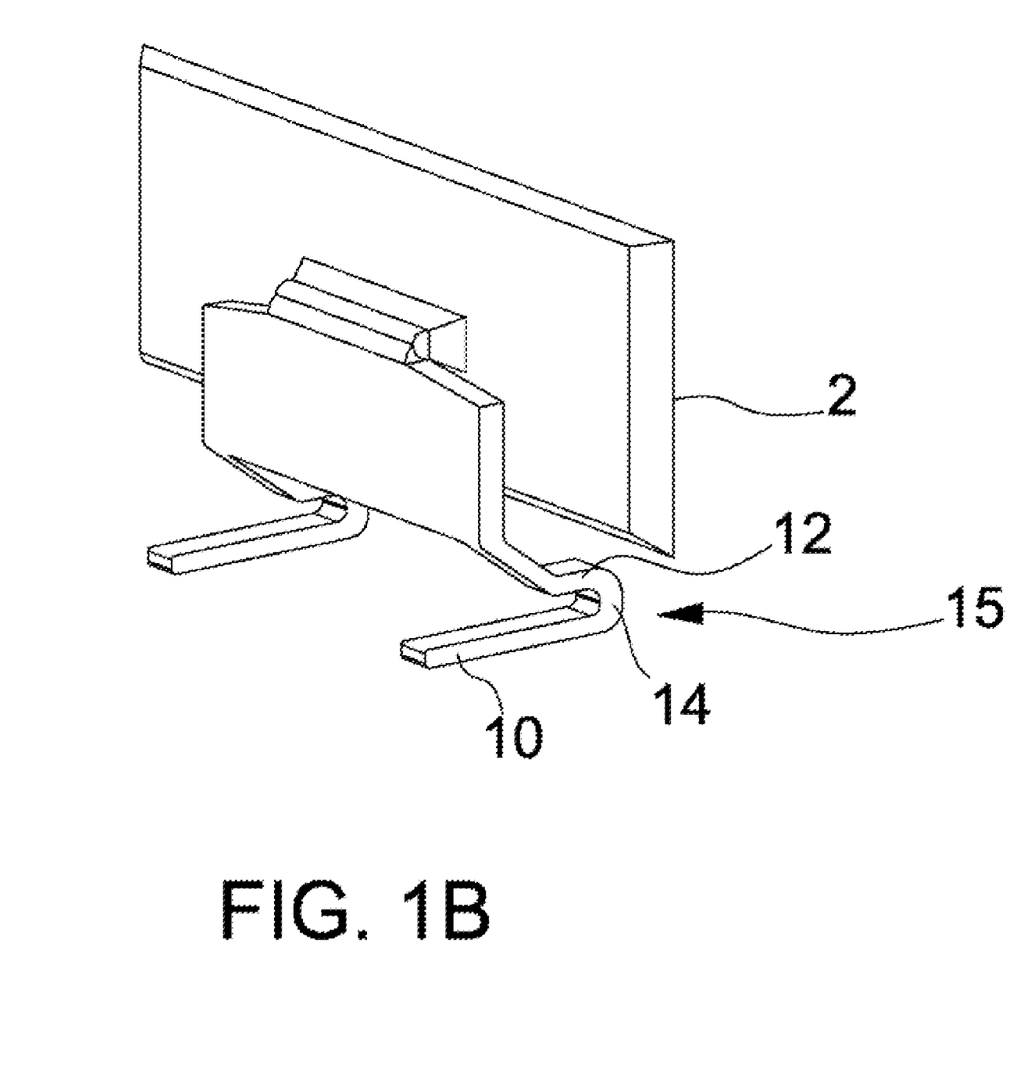
FIG. 1B is a rear perspective view of the first embodiment of the present invention.
Figure 2:
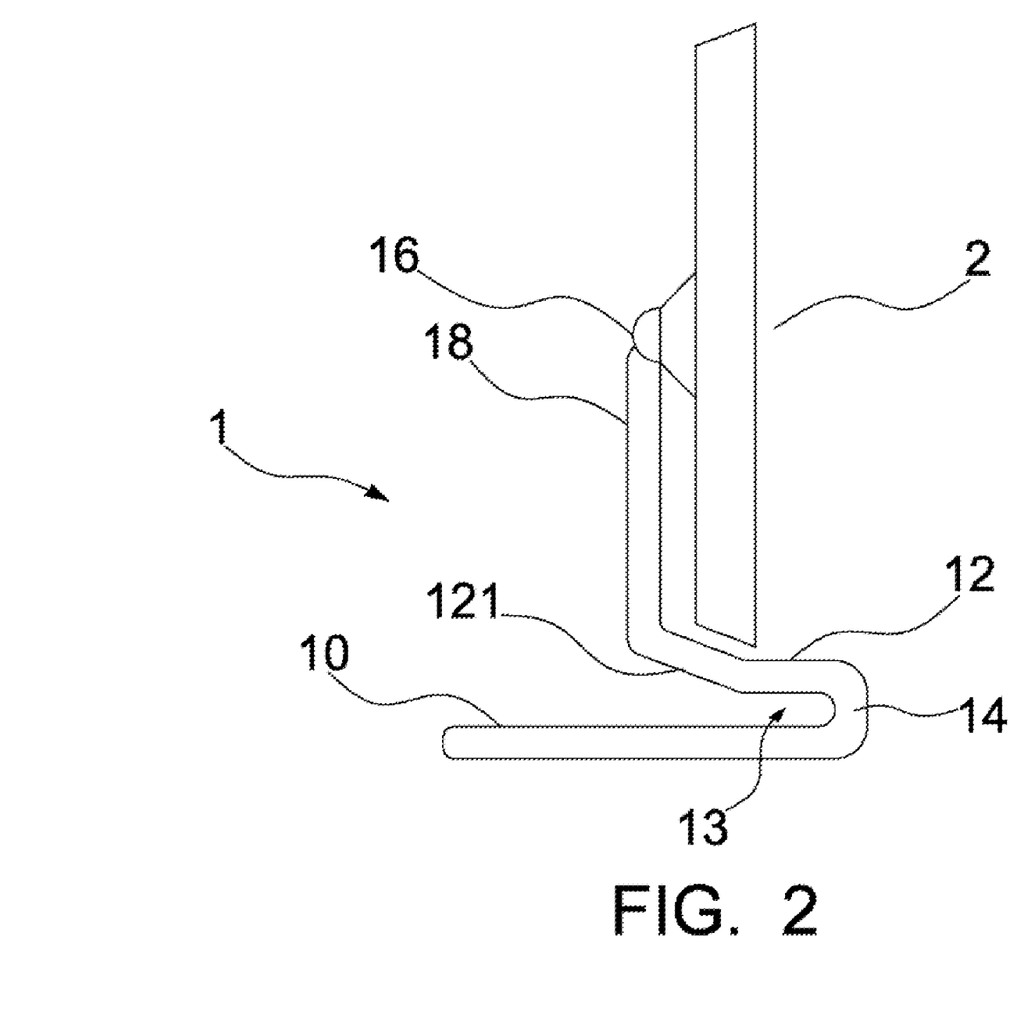
FIG. 2 is a side view of the present invention.

Please refer to FIGS. 1A, 1B and 2, which illustrate a flat panel display with a multifunctional stand disclosed by the present invention.

A multifunctional stand 1 of a display body 2 includes a stand body 15. The stand body 15 comprises a first fixed portion 10, a second fixed portion 12, an extending portion 14, a pivot member 16 and a support 18.

The first fixed portion 10 may be a thin body with a rectangular shape (FIG. 1), or a frame combined by more than one bar body (FIG. 1B).

The second fixed portion 12 may be a thin body with a rectangular shape (FIG. 1), or a frame combined by more than one bar body (FIG. 1B). A U-shaped portion 13 is formed between the second fixed portion 12 and the first fixed portion 10. Also, the second fixed portion 12 has a guide surface 121 extended from one end of the inner side.

The extending portion 14 may be a thin body with a rectangular shape (FIG. 1) or a frame combined by more than one bar body (FIG. 1B) for connecting the first fixed portion 10 and the second fixed portion 12. The first fixed portion 10, the second fixed portion 12 and the extending portion 14 formed a U-shaped stand body 15 with the U-shaped portion 13 between the first fixed portion 10 and the second fixed portion 12.

As shown in FIG. 2, the pivot member 16 joints on the back of the display body 2 for adjusting the viewing angle of the display body 2. Besides, the display body 2 can rotate correspondingly around the pivot member 16 for users to view or use. Moreover, the pivot member 16 may be a pivot structure or a ball-joint structure.

The support 18 is located on the end of the second fixed portion 12 distant from the extending portion 14, and its one end connected with the second fixed portion 12, and the other end connected with the pivot member 16.

According to the structure disclosed in the present invention, the first fixed portion 10, the second fixed portion 12 and the extending portion 14 may be formed integrally. The guide surface 121 of the second fixed portion 12 may directly extend to form the support 18. Furthermore, the orthogonal projection length of the first fixed portion 10 relative to a laid plane is longer than the orthogonal projection length of the second fixed portion 12 relative to the same laid plane. The first fixed portion 10 may be parallel to the second fixed portion 12. Besides, the first fixed portion 10, the second fixed portion 12 and the extending portion 14 may be formed separately in advance and then combined together according to actual design demands.

Figure 3A:
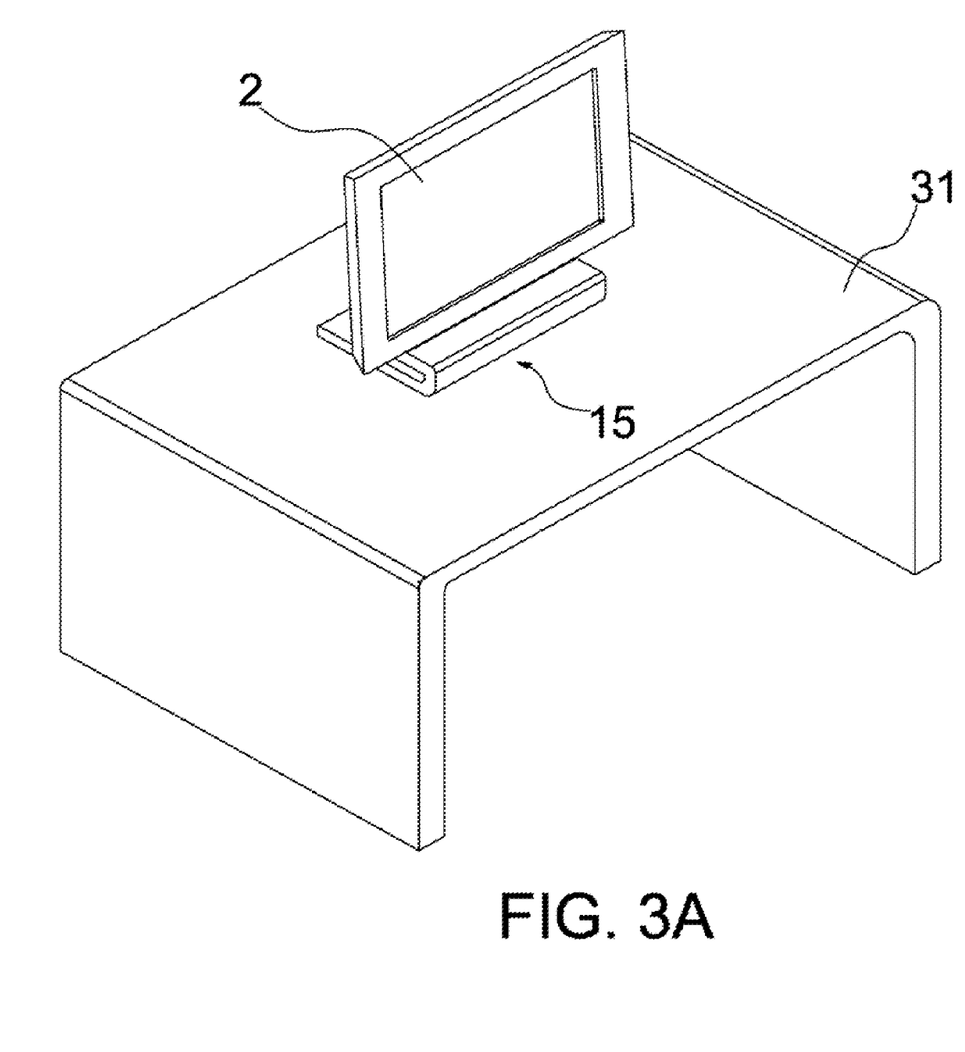
FIG. 3A is an explanatory diagram of the present invention when placed on a desk top.
Figure 3B:
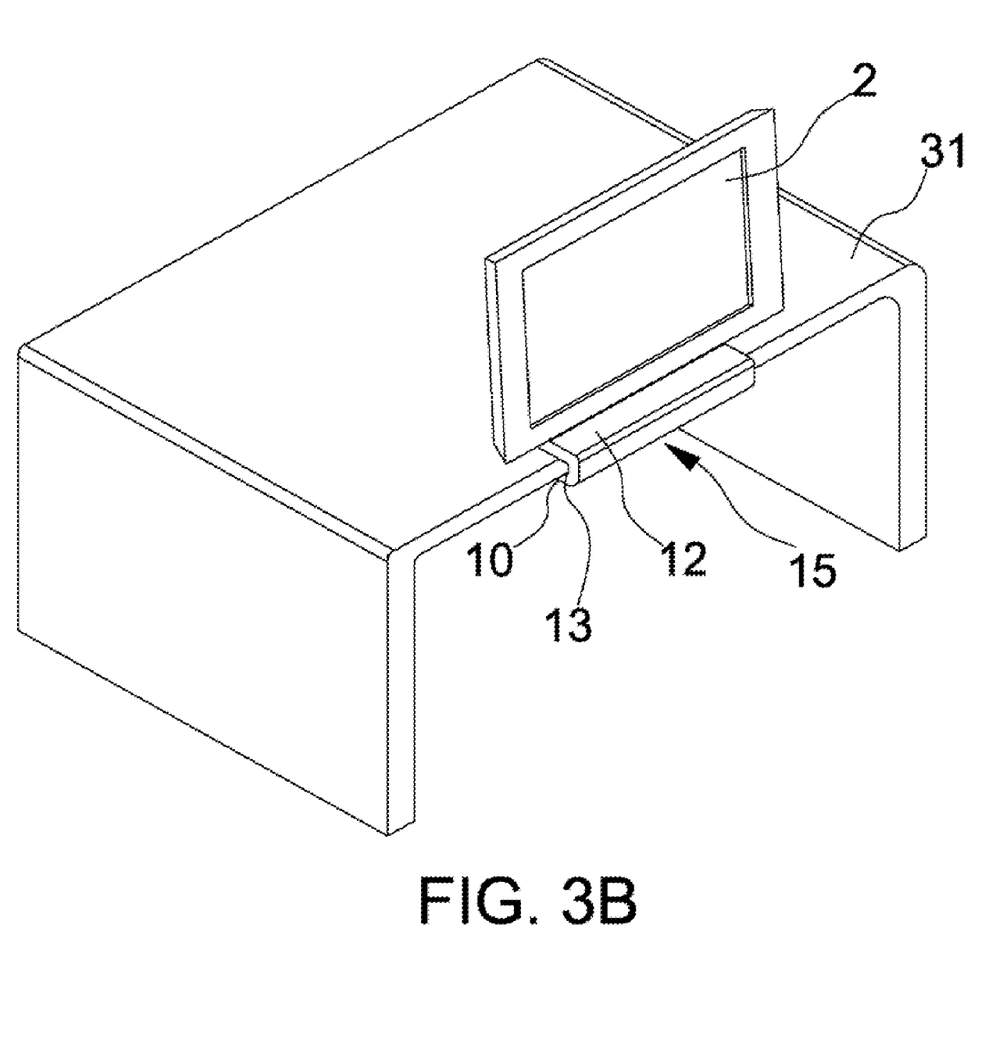
FIG. 3B is an explanatory diagram of the present invention when clamped on a desk top.
Figure 3C:
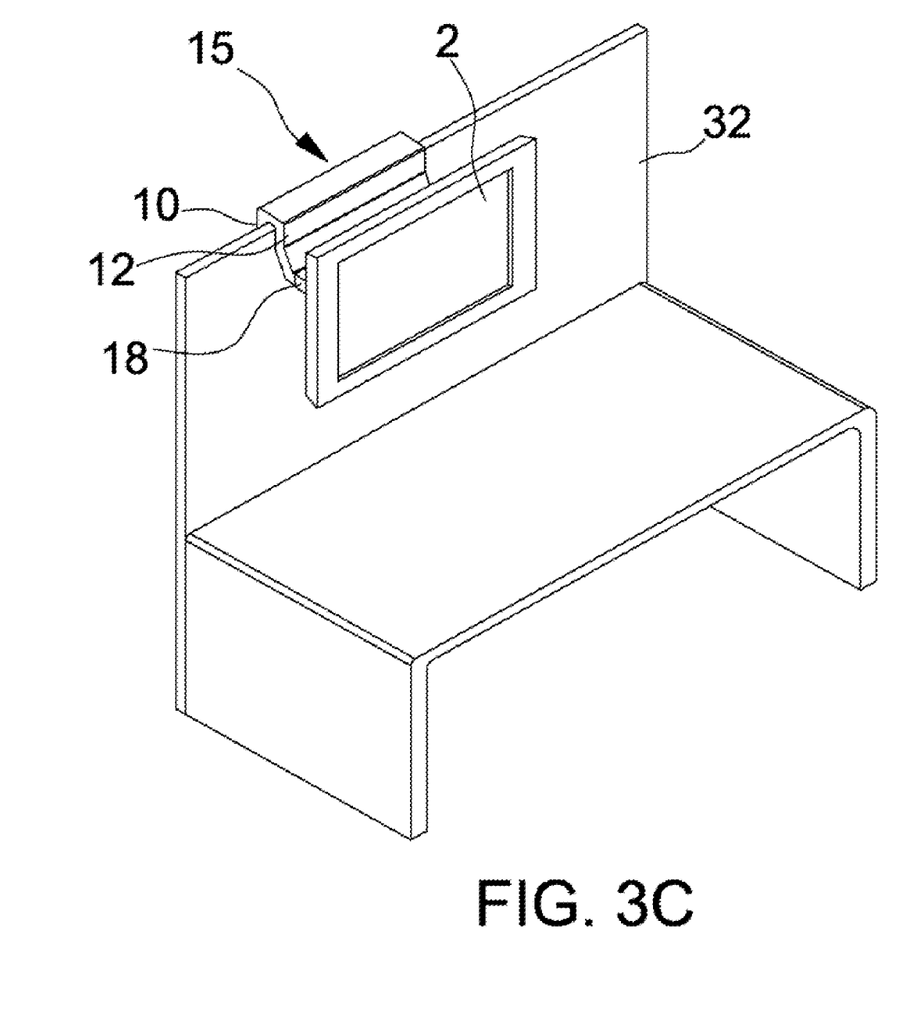
FIG. 3C is an explanatory diagram of the present invention when hung on a partition board.
Figure 3D:
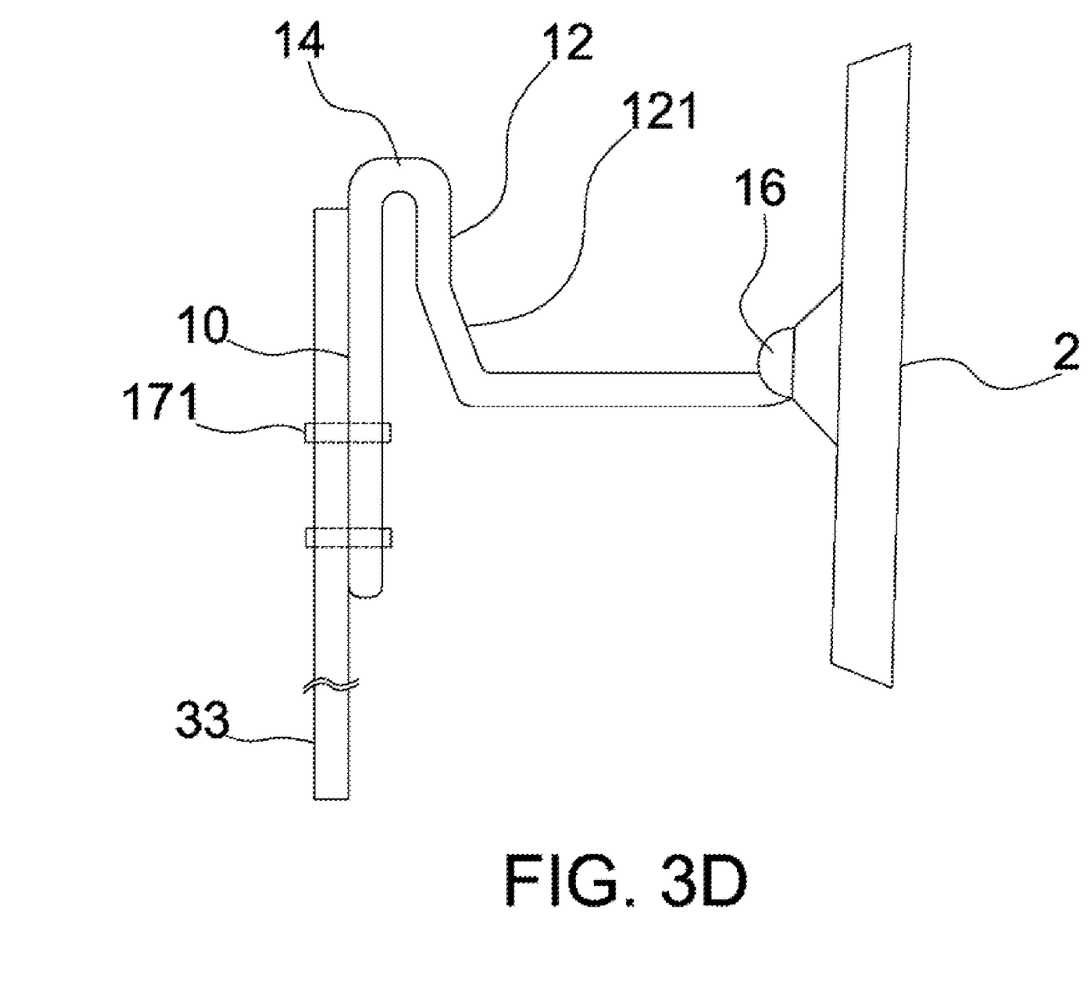
FIG. 3D is an explanatory diagram of the present invention when fastened on a wall.

In the above explanation, the guide surface 121 of the second fixed portion 12 can guide a board body 3 into the U-shaped portion 13 (FIG. 3E); the first fixed portion 10 and the second fixed portion 12 may also be used to clamp the board body 3 with a fastener 17; wherein the board body 3 can be a desk top 31 (FIG. 4A), a partition board 32 (FIG. 4B) or a wall 33 (FIG. 3D). The extending portion 14 can be made of elastic materials or flexible materials (such as metal plate), to enable the first fixed portion 10 and the second fixed portion 12 to flexibly clamp the board body 3 with various thicknesses. In addition, the first fixed portion 10 may be also configured with the guide surface 121 for guiding the board body 3 into the U-shaped portion 13. After the board body 3 enters the U-shaped portion 13, the first fixed portion 10 and the second fixed portion 12 hold the board body 3 tightly without additional clamping or fastening.

As shown in FIGS. 3A and 3B, the user may place the stand body 15 on a desk top 31 directly. Then use the pivot member 16 to adjust the display body 2 to an appropriate viewing angle for users to view or use. If the desk top 31 is not designated to be placed on the desk top 31 due to limited space or other reasons, the guide surface 121 of the second fixed portion 12 may be used to guide the edge of the desk top 31 into the U-shaped portion 13. Then the first fixed portion 10 and the second fixed portion 12 used to clamp the desk top 31 and fasten on the desk edge. The display body 2 may be adjusted to an appropriate viewing angle for users to view or use.

As shown in FIG. 3C, when the user wants to hang the display body 2 on the partition board 32, the guide surface 121 of the second fixed portion 12 guide the partition board 32 into the U-shaped portion 13, and the first fixed portion 10 and the second fixed portion 12 may clamp the partition board 32. The stand body 15 will then be hung on the partition board 32 with the display body 2 supported by the stand body 15 and the support 18. After the display body 2 is hung on the partition board 32, the user may just use the pivot member 16 to adjust the display body 2 to an appropriate viewing angle for users to view or use.

As shown in FIG. 3D, the user may use one or more fasteners 17, such as bolts 171 to secure the first fixed portion 10 on the wall 33. Thus, the display body 2 is hung on-wall and ready for users to view or use by adjusting the display body 2 to an appropriate viewing angle. Accordingly, the user may use the fastener 17 to fasten the second fixed portion 12 or the extending portion 14 according to various demands of space arrangement, thereby increasing the flexibility of space arrangement for the user and enhancing the decoration effects.

Figure 3E:
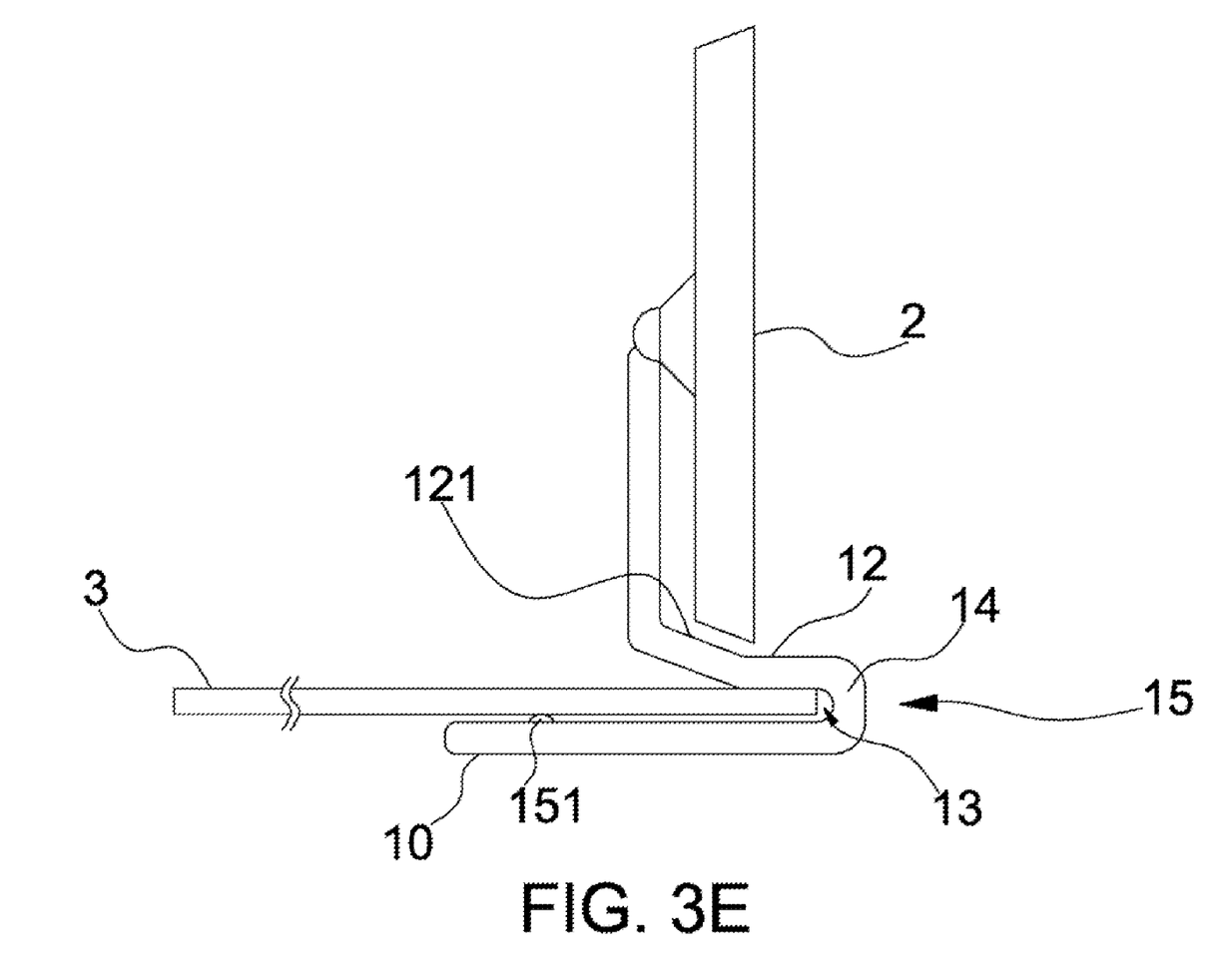
FIG. 3E is an explanatory diagram of the present invention, wherein a rubber pad presses the board body tightly.

As shown in FIG. 3E, to enhance the effects of the stand body 15 while clamping the board body 3, the first fixed portion 10 may be configured with one or more rubber pads 151. When the board body 3 is guided by the guide surface 121 into the U-shaped portion 13, the rubber pad 151 may be used to press the board body 3 tightly against the second fixed portion 12 and prevent the board body 3 from loosing off. Moreover, the rubber pad 151 may be configured on the second fixed portion 12. Then the effects of the stand body 15 while clamping the board body 3 may be enhanced as well.

Figure 4A:
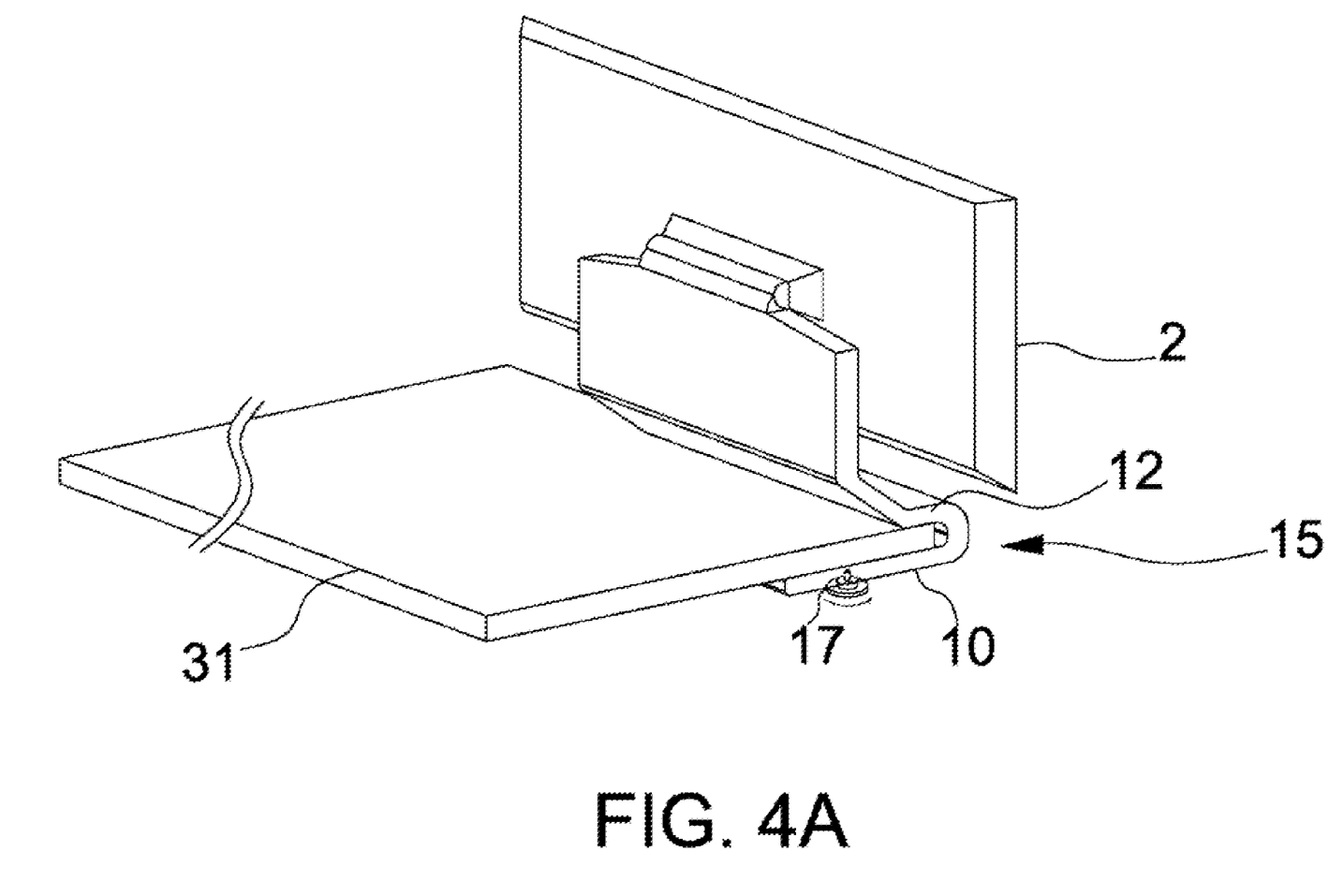
FIG. 4A is an explanatory diagram for a second embodiment of the present invention when clamped on a desk top.
Figure 4B:
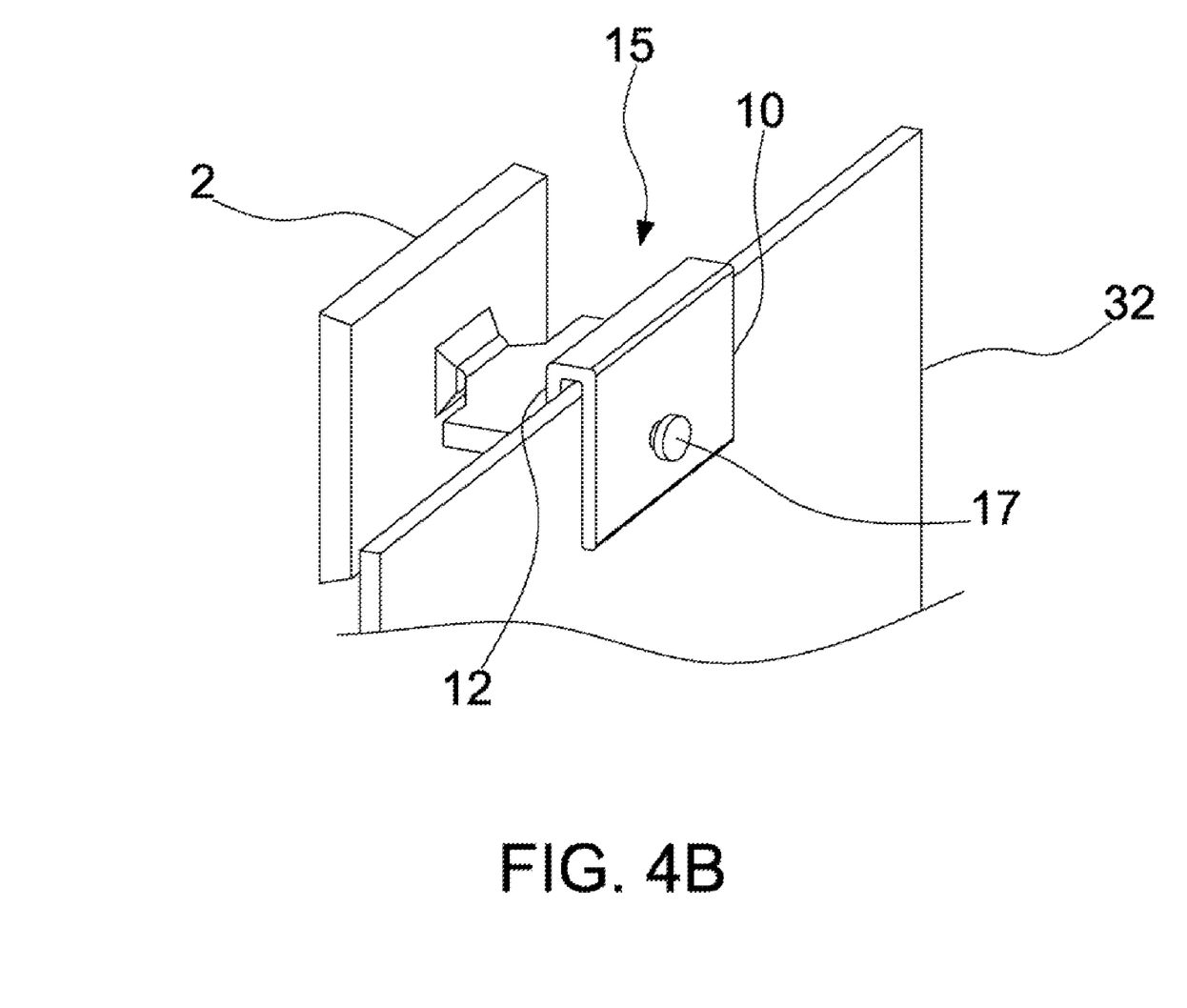
FIG. 4B is an explanatory diagram for the second embodiment of the present invention when hung on a partition board.

As shown in FIG. 4A, when the stand body 15 clamps to the desk top 31 edge, the user may insert the fastener 17 through the first fixed portion 10 to press against the desk top 31. The fastener 17 can screw tightly to enhance the clamping effects. Therefore, the desk top 31 with various thicknesses may also be clamped perfectly to enable the user to apply the display body 2 to different thickness desk tops 31. As shown in FIG. 4B, when the stand body 15 is clamping the partition board 32 to make the display body 2 hung on the partition board 32, the user may insert the fastener 17 through the first fixed portion 10 to press against the partition board 32. The fastener 17 can screw tightly to enhance the clamping effects. Accordingly, the partition board 32 with various thicknesses may all be clamped to increase the convenience for users to view or use.

The fastener 17 noted above may be inserted through the first fixed portion 10 or the second fixed portion 12 to press against the desk top 31 or the partition board 32 tightly, so the desk top 31 or the partition board 32 may be pressed onto the first fixed portion 10. Therefore the clamping effects may be enhanced as well, and the display body 2 may also clamp the desk top 31 or the partition board 32 with various thicknesses.

Figure 5:
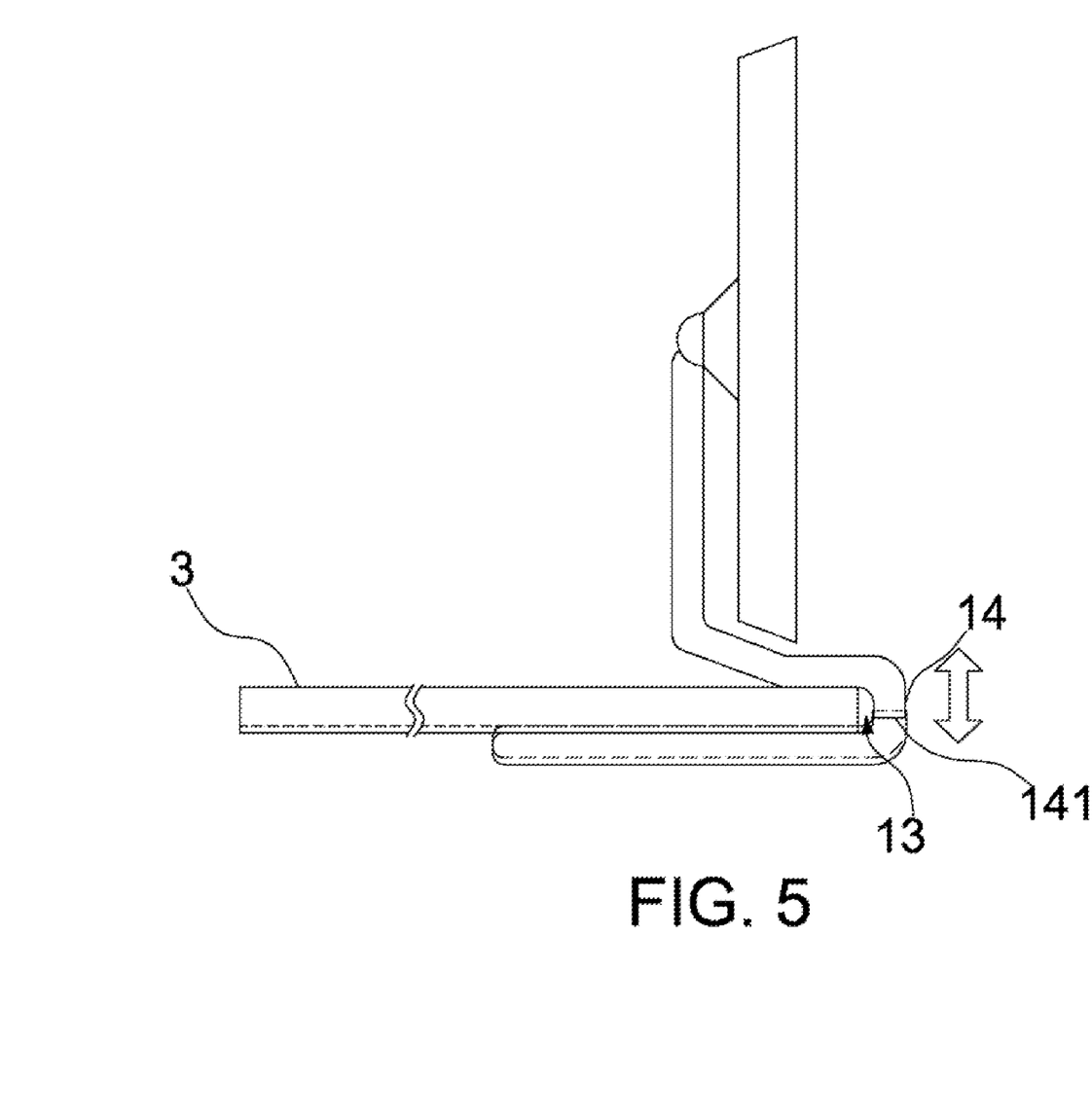
FIG. 5 is an explanatory diagram for a third embodiment of the present invention with the adjustable portion.

As shown in FIG. 5, the extending portion 14 may further include an adjustable portion 141 for adjusting the size of the U-shaped portion 13. When the user uses a thicker board body 3, the adjustable portion 141 can be adjusted to enlarge the U-shaped portion 13 to clamp thicker board body 3. Oppositely, using the adjustable portion 141 it is possible to reduce the U-shaped portion 13 to clamp a thinner board body 3. Therefore, the board body 3 with different thicknesses can be perfectly clamped and increase the convenience for users to view or use.

Figure 6A:
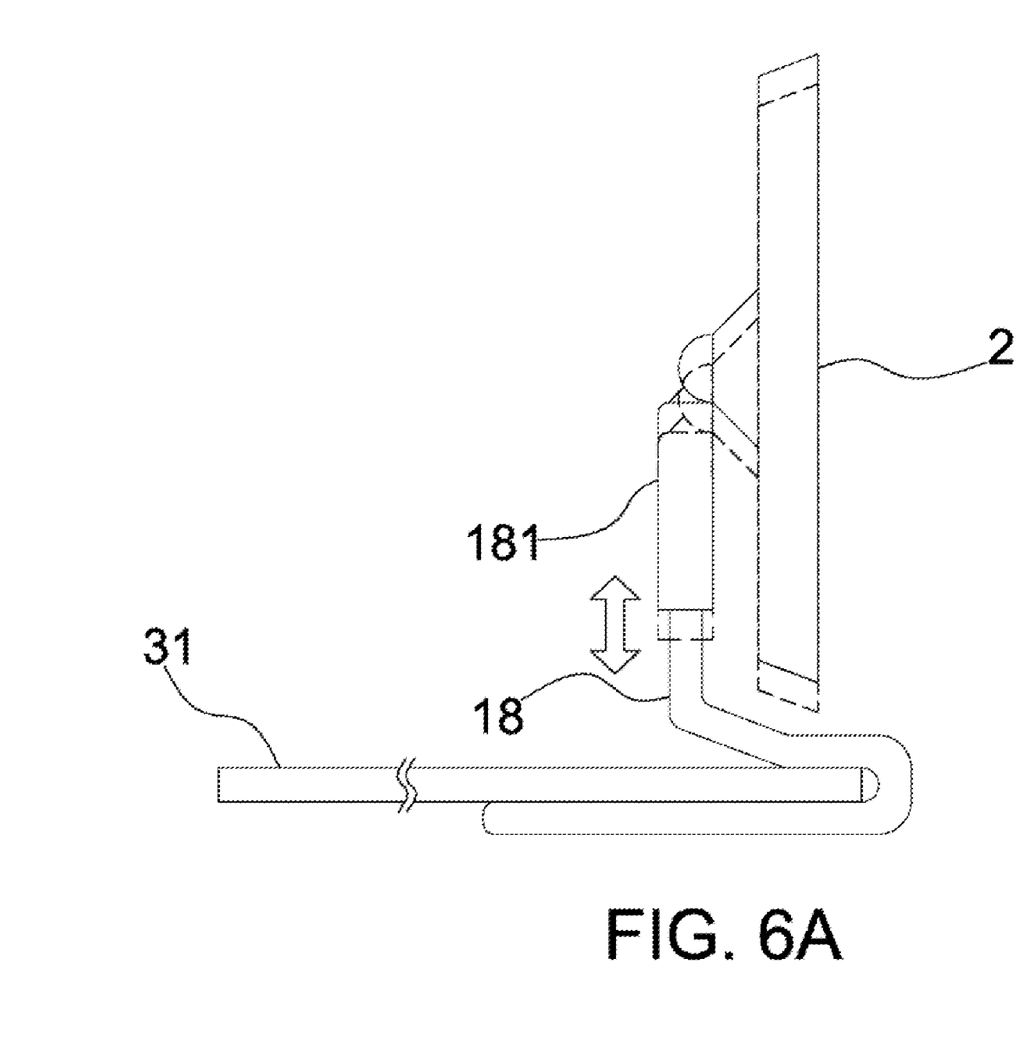
FIG. 6A is an explanatory diagram for a fourth embodiment of the present invention with the telescopic portion.
Figure 6B:
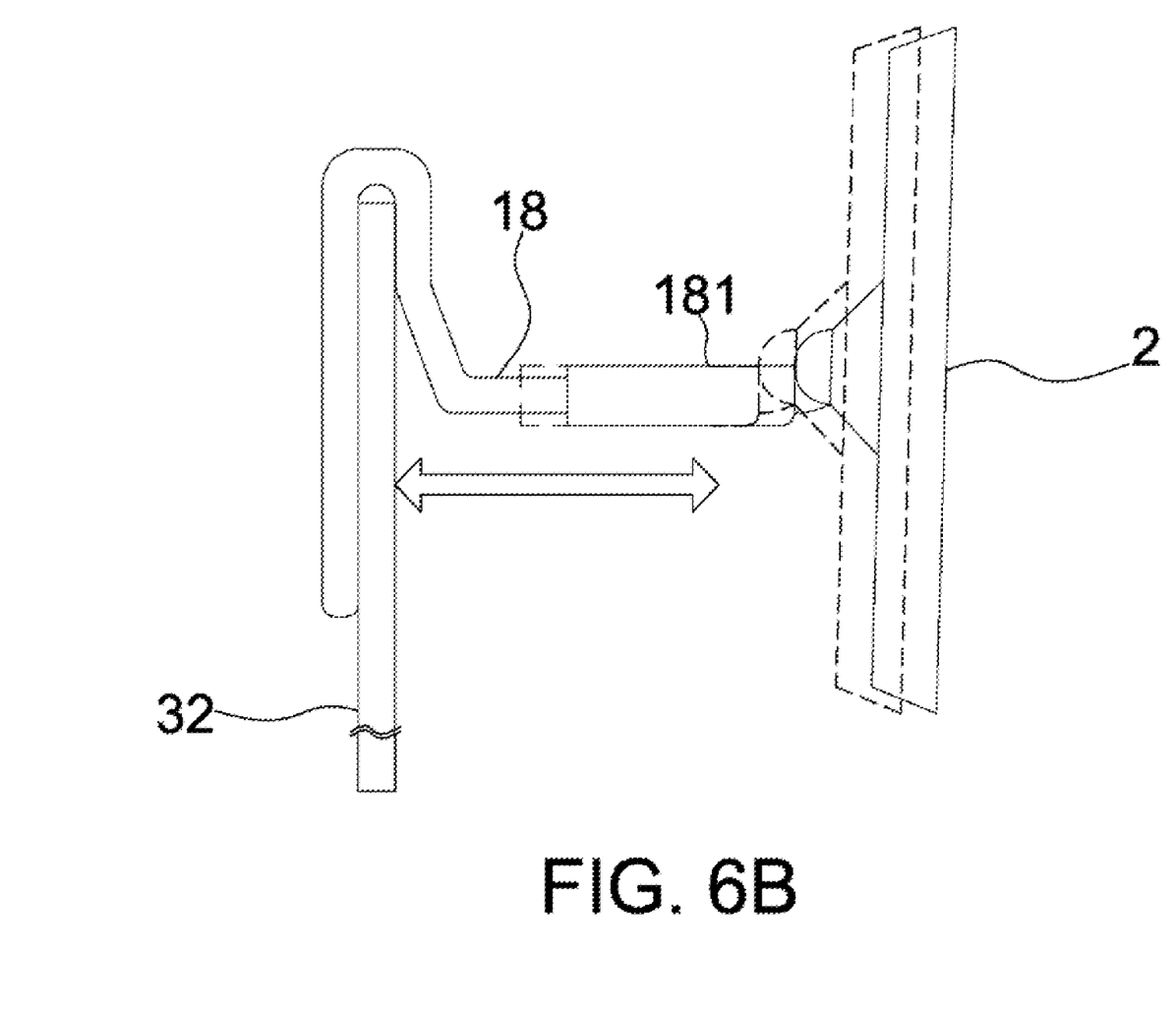
FIG. 6B is an explanatory diagram for the fourth embodiment of the present invention when hung on a partition board with the telescopic portion.

As shown in FIG. 6A, the support 18 may further includes a telescopic portion 181 to extend or contract. When the user places the display body 2 on the desk top 31, or clamp on the desk top 31 to fasten the display body 2 on the desk edge, the telescopic portion 181 may extend or contract to adjust the support 18 and the display body 2 to a proper height for users to view or use. As shown in FIG. 6B, when the display body 2 is hung on the partition board 32 or fastened on the wall 33, the user may extend or contract the telescopic portion 181 to adjust the length of the support 18. Consequently, the user may be allowed to adjust the distance between the display body 2 and the partition board 32 or the wall 33.

The telescopic portion 181 described above may be configured at one end of the support 18 and connected with the pivot member 16; or, configured the telescopic portion 181 at the middle portion of the support 18 to adjust the length of the support 18 similarly.

Figure 7A:
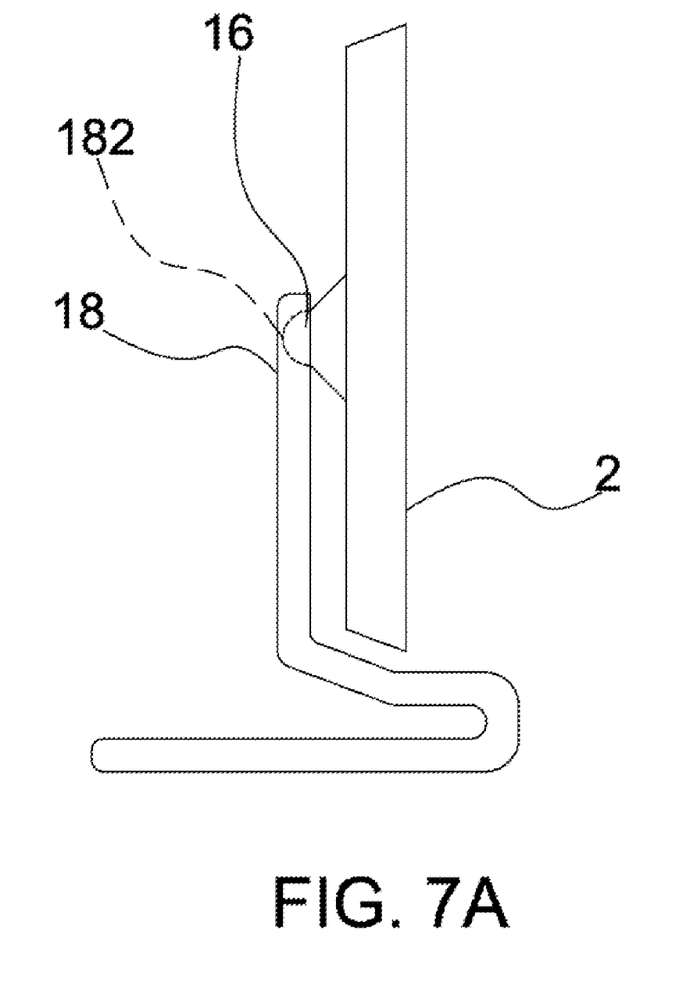
FIG. 7A is a side view of a fifth embodiment of the present invention.
Figure 7B:
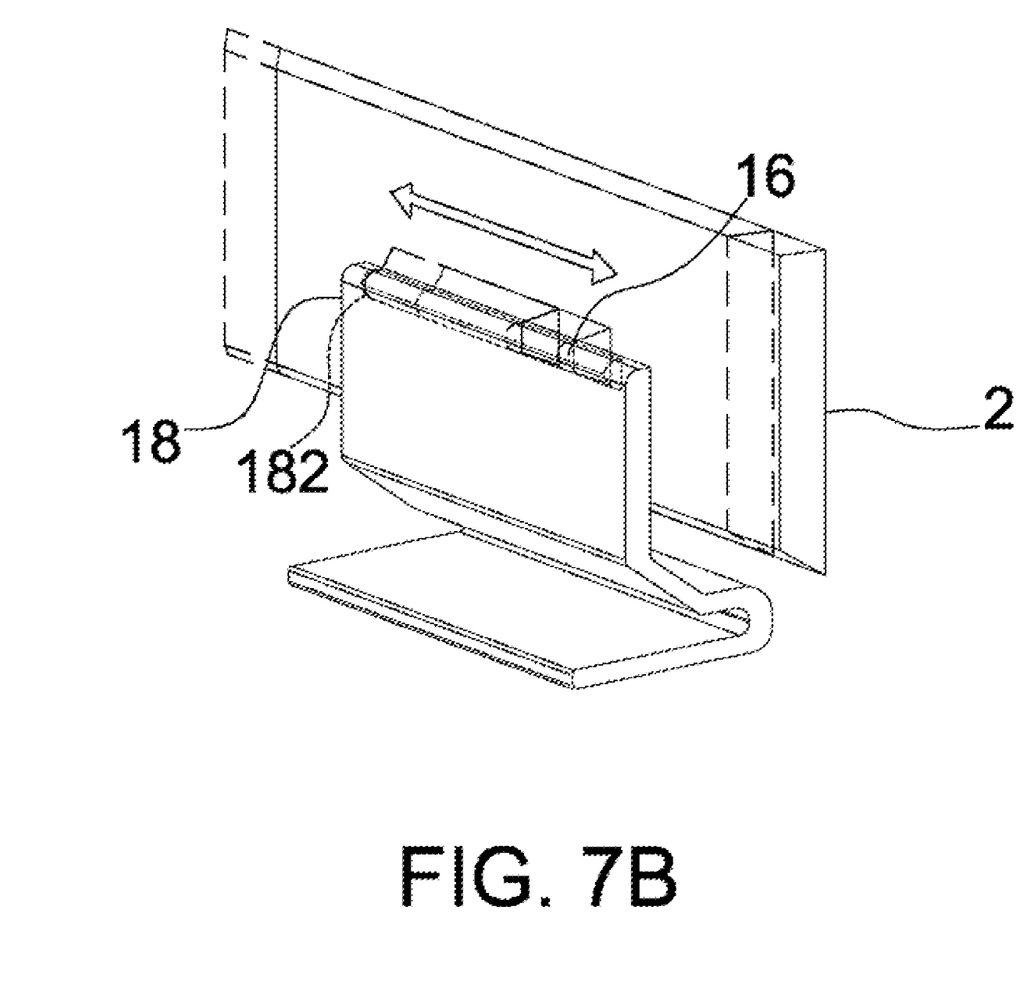
FIG. 7B is a rear perspective view of the fifth embodiment of the present invention.

As shown in FIGS. 7A and 7B, the support 18 has a sliding slot 182 configured at the end connecting with the pivot member 16 to allow the pivot member 16 inserting into the sliding slot 182 for sliding therein. The display body 2 will be able to slide left or right to increase the convenience for users to view or use.

According to a preferred embodiment of the present invention, the aforesaid adjustable portion 141 and the telescopic portion 181 may include an outer tube and an inner tube coaxially configured. The outer and inner tubes may relatively move to extend or contract. Please be noted hereby that the preferred embodiment is only for providing an example of extending/contracting structure, not for limiting the present invention.

In accordance with the structure disclosed by the present invention, the flat panel display may be placed on the desk top, or clamping on the desk edge. When the user needs the flat panel display to be hung on-wall, the display stand may easily be hung on the partition board or fastened on the wall. Therefore, the drawbacks of time/effort consuming to mount/dismount the display in the prior art have been solved. From now on the user may freely position the location of the flat panel display according to the viewing demands. Furthermore, the decoration effects of the flat panel display may be increased; not only the space of use is saved, the space arrangement for the user may be conveniently achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A flat panel display, comprising:
   a display body;
   a stand body comprising
      a single, unbroken continuous element forming
      a first fixed portion,
      a second fixed portion facing the first fixed portion,
      an extending portion connecting the first fixed portion and the second fixed portion, wherein a U-shaped portion is formed between the first fixed portion, the second fixed portion and the extending portion; and
      a support portion, having one end extending from the second fixed portion;
   a pivot member connected to the other end of the support portion and jointing on the rear of the display body to adjust a viewing angle of the display body;
   whereby said stand body may be used as
      a stand alone desk top display;
      as a horizontal desk mount using the folds of the U-shaped portion to mount to the horizontal plane of a desk; or
      as a hanging unit, using the folds of the U-shaped portion to secure said unit to a vertical plane.

2. The flat panel display as in claim 1, wherein the first fixed portion and the second fixed portion are for clamping a board body in the U-shaped portion.

3. The flat panel display as in claim 2, wherein the first fixed portion further comprises a guide surface for guiding the board body into the U-shaped portion.

4. The flat panel display as in claim 2, wherein the second fixed portion further comprises a guide surface for guiding the board body into the U-shaped portion.

5. The flat panel display as in claim 2, wherein the first fixed portion further comprises at least one rubber pad for pressing the board body tightly.

6. The flat panel display as in claim 2, wherein the second fixed portion further comprises at least one rubber pad for pressing the board body tightly.

7. The flat panel display as in claim 2, wherein the first fixed portion further comprises a fastener for pressing the board body onto the second fixed portion tightly.

8. The flat panel display as in claim 2, wherein the second fixed portion further comprises a fastener for pressing the board body onto the first fixed portion tightly.

9. The flat panel display as in claim 2, wherein the extending portion is made of plastic material.

10. The flat panel display as in claim 2, wherein the extending portion is made of metal material.

11. The flat panel display as in claim 2, wherein the extending portion further comprises an adjustable portion for adjusting the distance between the first fixed portion and the second fixed portion to decide the size of the U-shaped portion.

12. The flat panel display as in claim 1, wherein the first fixed portion further comprises a fastener to secure the first fixed portion on a board body.

13. The flat panel display as in claim 1, wherein the length of the first fixed portion is longer than that of the second fixed portion.

14. The flat panel display as in claim 1, wherein the first fixed portion and the second fixed portion are parallel to each other.

15. The flat panel display as in claim 1, wherein the second fixed portion further comprises a fastener for securing the second fixed portion on a board body.

16. The flat panel display as in claim 1, wherein the U-shaped portion is used for holding a board body.

17. The flat panel display as in claim 15, wherein the first fixed portion further comprises a guide surface for guiding the board body into the U-shaped portion.

18. The flat panel display as in claim 15, wherein the second fixed portion further comprises a guide surface for guiding the board body into the U-shaped portion.

19. The flat panel display as in claim 1, wherein the extending portion further comprises a fastener for securing the extending portion on a board.

20. The flat panel display as in claim 1, wherein the support portion further comprises a telescopic portion for adjusting the distance between the pivot member and the second fixed portion.

21. The flat panel display as in claim 20, wherein the telescopic portion connects with the pivot member.

22. The flat panel display as in claim 1, wherein the support portion further comprises a sliding slot to allow the pivot member inserting into the sliding slot for sliding therein.

23. The flat panel display as in claim 1, wherein the support portion is located on one end of the second fixed portion distant from the extending portion.

24. The flat panel display as in claim 23, wherein the support portion is formed by directly extending from the second fixed portion.

25. The flat panel display as in claim 1, wherein the pivot member is a ball-joint structure.

* * * * *